UNITED STATES PATENT OFFICE.

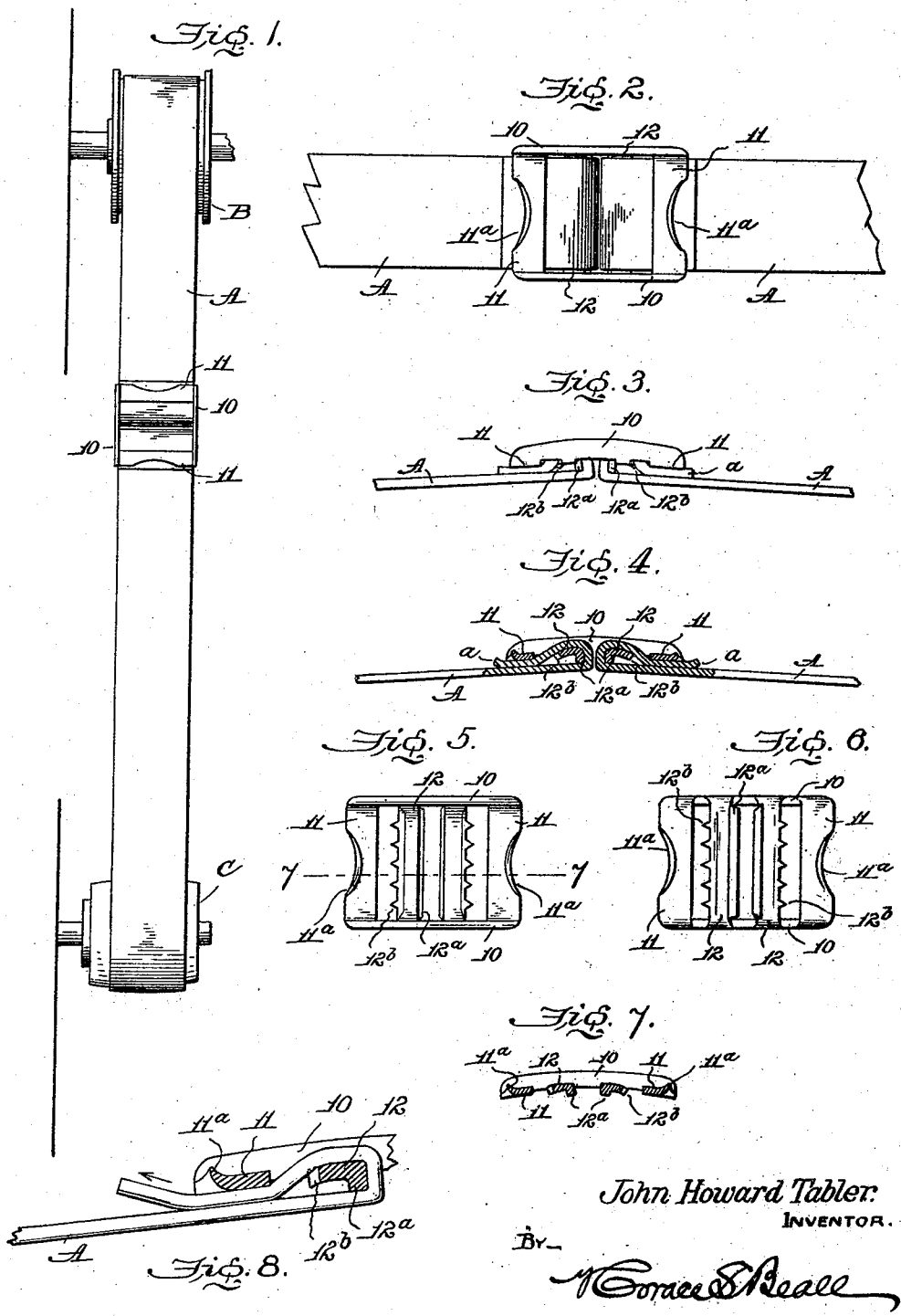

JOHN HOWARD TABLER, OF WASHINGTON, DISTRICT OF COLUMBIA.

BELT FASTENER.

1,420,588.

Specification of Letters Patent. Patented June 20, 1922.

Application filed October 5, 1920. Serial No. 414,843.

*To all whom it may concern:*

Be it known that I, JOHN HOWARD TABLER, a citizen of the United States, residing at Washington, District of Columbia, have invented a Belt Fastener, of which the following is a full and complete specification.

The primary object of my present invention is to provide a metal fastening device in one piece especially adapted for connecting the ends of machine belts to not only form a simple, strong and secure connection but one that may be cheaply applied without the use of tools and will permit slack in the belt to be readily and conveniently taken up to any extent desired.

A further object of my invention is to provide a metal fastening device for machine belts in which no part of the said device comes in contact with the faces of the pulleys whereby the belt will run smoothly over said pulleys to not only obviate wear on the fastening device and pulleys but also provide an easy running belt free of noise.

A further and important object of my present invention is the construction of a metal fastening device of this type in which the ends of the belt will be securely confined therein against the pulling tension of the body of the belt to maintain the adjustment of the said belt between the pulleys but will permit either terminal portion to be readily pulled through the device to take up slack caused by stretching of the belt; the confinement of the ends in this positive manner also permitting the terminal portion that is pulled beyond the end of the device to be cut off close to the same and thereby eliminate a projecting loose end that would flap and fray or unravel when cotton webbing is used.

These pricipal objects are accomplished by the peculiar formation of the fastening device to provide at each end thereof a cross-piece with an adjoining cooperating cross-bar, the latter having teeth projecting in the direction of the cross-piece to slightly engage or bite into the terminal portion of the looped end of the belt extending from said cross-bar; all as hereinafter described and claimed.

In the accompanying drawings:—

Fig. 1 is a view illustrating the application of my invention.

Fig. 2 is a plan view of the fastening device with the ends of the belt connected thereto.

Fig. 3 is a side elevation.

Fig. 4 is a longitudinal sectional view through the fastening device and ends of the belt.

Fig. 5 is a detail plan view of the fastening device.

Fig. 6 is a bottom plan view thereof.

Fig. 7 is a longitudinal sectional view, on the line 7—7 of Fig. 5.

Fig. 8 is an enlarged view to more clearly illustrate the operation of the teeth on the cross-bar.

In carrying out my invention the fastening device is made to comprise opposite parallel side pieces 10, 10, with cross-pieces 11 between the ends thereof and a cross-bar 12 in the rear of each cross-piece at a slight distance therefrom, so as to provide a cross-piece and companion cross-bar at both ends of the device for connecting the ends of a length of belt material thereto. In the present instance the cross-bars 12 over which the ends of the belt are looped are of peculiar construction in cross-section whereby the lower portions of said loops of the belt will be on a line with each other to present a practically continuous engaging surface for the belt as it passes over the pulleys, and to accomplish this the inner portion of each cross-bar is bent downward, as at 12ª, so that the lower edge thereof will be disposed below the plane of the underside of the adjoining cross-piece 11 a distance approximating the thickness of the belt or webbing. Each cross-bar may be, and preferably is, also provided at its outer edge, opposite the inner edge of the companion cross-piece 11, with teeth 12ᵇ to provide a more secure engagement of the looped portions of the belt with the parts of the fastening device, and that portion of the cross-bar having the teeth is curved slightly downward, as shown, so that the teeth will only slightly engage in the belt material. The cross-bars are located sufficiently close together so that when the ends of the belt are in looped engagement with the fastening device they will meet, or nearly so, with the underside of the belt at the fastening device presenting a straight or continuous bearing surface, as hereinbefore explained and shown in Figs. 3 and 4 of the drawings; and it will be noted that the particular form given to the cross-bars eliminates the gap between the connected ends of the belt when the lower edge of the cross-bar is on a plane with or above the lower edge of the companion cross-piece, an arrangement commonly employed in this general type of buckle. Such a gap not only causes wear on the belt at this point or points as it passes over the pulleys but also prevents the easy running of the belt as provided for in the present instance.

The cross-pieces at the ends of the fastening device and which cooperate with the cross-bars in attaching the ends of the belt in said fastening device are preferably made wide to provide a greater surface-bearing for the terminal portions of the belt confined between said cross-pieces and body of the belt, and as this increased bearing is only required at the side edges of the belt the central portion of the outer edge of each cross-piece is cut away and turned up, as at 11ª, to form a finger-hold for lifting the fastening device at either end and also a recess to facilitate gripping the end of the belt in tightening the same. As will be obvious, the main purpose of the wide cross-pieces is to confine the terminals of the belt so that they may be cut off close up to the ends of the fastening device.

The device is made in one piece and is not only light in construction but can be manufactured at small cost. It is preferably struck from sheet metal, the blank being first cut out to provide for shaping the cross-pieces and toothed cross-bars and bending up the side pieces to rise vertically from the ends of said cross-pieces and cross-bars. However, I may form the device by casting, or otherwise, but when it is stamped from sheet metal, as steel, the teeth are well defined and therefore more effective in gripping the belt, but it will be noted by reference to Fig. 8 that it is only the upper ends of said teeth that engage the belt.

In applying the fastening device to a length of belt-material, as cotton webbing, one end of the latter is first connected to one end of said device by looping it over a cross-bar 12 from the underside thereof so that the terminal portion of the belt may be brought out beneath the companion cross-piece 11, and in like manner the other end of the belt is connected to the opposite end of the fastening device. When the belt is fitted over the pulleys it is tightened to take up slack by pulling on either one or both of the projecting ends or terminals, as a, and when tightened the body portion of the belt will confine the terminal portions against the underside of the cross-pieces permitting the projecting loose ends to be cut off close to the ends of the fastening device. As will be obvious the operation of applying the device in fastening the ends of a belt and adjusting the belt between the pulleys is easily and quickly accomplished without requiring the use of tools, and the particular manner in which each end of the belt is connected to the device provides for quickly taking up slack that may occur by stretching of the belt in use. Furthermore, as the metal fastening device is durable and not subject to wear by contact with the pulleys a worn belt may be renewed by simply removing the fastening device from the old one and applying it to a new length of belt-material.

When the belt is in use the pulling strain is of course on the body of the belt which extends around and between the pulleys from one end of the fastening device to the other, and the looped end portions of said belt which are in engagement with said fastening device are each securely attached to the latter against this pulling strain by frictional engagement with a cross-bar and lower corner of the inner edge of the companion cross-piece, as well as the underside of said cross-piece, augmented by the engagement of the teeth at the forward edge of the cross-bar opposing the strain or tension. The engagement of the teeth also holds and prevent the looped end portions of the belt slipping or creeping around the cross-bars during the usual vibration of the belt between the pulleys. Though the engagement of the teeth prevent slipping of the attached ends of the belt in the fastening device in the direction of the body of said belt they do not interfere with the operation of tightening the belt, as the terminal portion, or portions, in this instance are pulled in the opposite direction and will ride over the teeth, for the upper ends only of the latter engage the belt presenting sharp points projecting towards the ends of said belt. It is for this reason I dispose the teeth at the forward edge of each cross-bar opposite the inner edge of the companion cross-piece.

In removing a belt either end thereof may be detached by lifting an end of the fastening device so that the terminal portion of said belt at this end of said device may be pushed up and out from between the cross-piece and toothed cross-bar and then drawn out from between said cross-bar and attached end of the belt looped over the other cross-bar.

Inasmuch as it is only the upper ends or edges of the teeth that engage the belt it is of course not necessary to have the said teeth the full thickness of the cross-bar, and therefore they may be formed at the upper part only of the forward edge thereof; furthermore, as only a very slight engagement with the belt is required, owing to the frictional engagement of the looped end of said belt in the fastening device, short teeth or probably a serrated edge will answer; and in any event the engagement is not sufficient to materially injure or at all weaken the belt at this point.

Having described my invention, I claim:

1. A fastening device for belts comprising side pieces, a cross-piece between the ends thereof with a belt engaging lower edge at its inner side, and a companion cross-bar between the side pieces in the rear of the aforesaid cross-piece around which the end of the belt is looped and passed out below the cross-piece between the body of the belt and said cross-piece, the lower edge of the cross bar being on a plane below the belt engaging edge of the cross-piece a distance approximating the thickness of the belt, substantially as shown and for the purpose set forth.

2. A fastening device for belts comprising side pieces, opposite cross-pieces each having a belt engaging lower edge at its inner side, and intermediate cross-bars—one for each cross-piece in the rear thereof—around which the ends of the belt are looped to pass out below the cross-pieces between the body of the belt and said cross-pieces, the aforesaid cross-bars being spaced so that the portions of the belt extending thereover will be close together and the lower edges of the cross-bars disposed on a plane below the belt engaging edges of the cross-pieces a distance approximating the thickness of the belt, for the purpose set forth.

3. A fastening device for belts comprising side pieces, a cross-piece between said side pieces with a plain belt engaging lower edge at its inner side, and a companion cross-bar in the rear of the aforesaid cross-piece having a plain rear edge and teeth at its forward edge opposite the belt engaging edge of the cross-piece.

4. A fastening device for belts comprising side pieces, cross-pieces between the sides pieces at the ends thereof with a belt engaging lower edge at the inner side of each cross-piece, and intermediate cross-bars— one for each cross-piece in the rear thereof—around which the ends of the belt are looped to pass out below the cross-pieces between the body of the belt and said cross-pieces, said cross-bars having each a plain inner edge and teeth at its outer or forward edge opposite the belt-engaging edge of the companion cross-piece and the lower edges of the cross-bars disposed on a plane below the lower edges of the cross-pieces approximating the thickness of the belt so that the lower surfaces of the attached ends of the belt below the fastening device will be on a line with each other, for the purpose set forth.

JOHN HOWARD TABLER.